United States Patent
Lambrecht et al.

(10) Patent No.: US 7,176,177 B2
(45) Date of Patent: Feb. 13, 2007

(54) AROMAS AND AROMA COMPOSITIONS CONTAINING 4,8-DIMETHYL-3,7-NONADIEN-2-ONE, AND A METHOD FOR THE PRODUCTION THEREOF

(75) Inventors: Stefan Lambrecht, Holzminden (DE); Günter Kindel, Höxter (DE); Erich Dilk, Holzminden (DE); Matthias Güntert, Ridgewood, NJ (US)

(73) Assignee: Symrise GmbH & Co. KG, Holzminden (DE)

( * ) Notice: Subject to any disclaimer, the term of this patent is extended or adjusted under 35 U.S.C. 154(b) by 407 days.

(21) Appl. No.: 10/149,859

(22) PCT Filed: Dec. 4, 2000

(86) PCT No.: PCT/EP00/12160

§ 371 (c)(1),
(2), (4) Date: Sep. 3, 2002

(87) PCT Pub. No.: WO01/43567

PCT Pub. Date: Jun. 21, 2001

(65) Prior Publication Data

US 2003/0096731 A1  May 22, 2003

(30) Foreign Application Priority Data

Dec. 16, 1999  (DE) ............... 199 61 030

(51) Int. Cl.
*A61Q 13/00* (2006.01)
(52) U.S. Cl. .......... 512/27; 426/534; 568/303; 568/382; 568/383; 568/384
(58) Field of Classification Search ........... 512/27; 426/534; 568/303, 382, 383, 384
See application file for complete search history.

(56) References Cited

U.S. PATENT DOCUMENTS 3,932,462 A   1/1976  Goetz et al. ............. 260/340.7
4,385,185 A * 5/1983  Gebauer et al. ............ 568/308

OTHER PUBLICATIONS

Bol. Inst. Quim Univ. Nacl. Autón. Méx. 21, (month unavailable) 1969, pp. 226-240, "Sintesis DE Compuestos Aliciclicos", C. Aguilar, M. Salmón and F. Walls.

R. Weyerstahl et al.: "Constituents of Brazilian Vassoura Oil" Flavour and Fragrance Journal, vol. 11, - 1996 pp. 15-23, XP000994831 cited in the application, p. 15, last paragraph; table 1.

Database Chemabs 'Online! Chemical Abstracts Service, Columbus Ohio, US; Motl, O. et al: "Terpenes. 270. Composition of Brasilian vassoura oil from Baccharis dracunculifolia" retrieved from Baccharis dracunculifolia retrieved from STN Database accession No. 99:218399 CA XP002164314 abstract & Parfuem. Kosmet. (1983), 64(9), 488, 491.

V.K. Agarwal et al.: "A Search for New Aroma Chemicals. Part VI. Chemical Transformations of Citral into Perfumery Products" Indian Perfumer, vol. 27, No. 2, - 1983 pp. 112-118, XP000994819 cited in the application p. 112, left-hand column; table 1.

Yasuhiko Kurusu et al.: "Catalysis by Tetrabromooxomolybdate(V) Complex: Oxidation of Olefins and Alcohols with t-butyl hydroperoxide" Polyhydron, vol. 5, No. 1-2, - 1986 pp. 289-296, XP000994833 figure 7; table 6.

Yoshiro Masuyama et al.: "Chemoselective Oxidation of Molybdenum Catalyst t-Butyl; Hydroperoxide" Tetrahydron Letters, vol. 25, No. 39, - 1984 pp. 4417-4420, XP000985898 figure 2; table.

* cited by examiner

*Primary Examiner*—Monique T. Cole
(74) *Attorney, Agent, or Firm*—Akerman Senterfitt; Stephan A. Pendorf

(57) ABSTRACT

4,8-dimethyl-3,7-nonadien-2-one has aromatizing properties and increases the extendibility and intensity of the aroma when used in an aroma composition.

11 Claims, No Drawings

AROMAS AND AROMA COMPOSITIONS CONTAINING 4,8-DIMETHYL-3,7-NONADIEN-2-ONE, AND A METHOD FOR THE PRODUCTION THEREOF

FIELD OF THE INVENTION

The invention relates to aromas and aroma compositions which comprise 4,8-dimethyl-3,7-nonadien-2-one and to their use in foodstuffs and luxury products or in products for oral hygiene.

BACKGROUND OF THE INVENTION

In the aroma industry there is a great need for substances which are able, in aromas and aroma compositions, to partially or completely replace natural substances which, because of the laborious nature of their isolation, are expensive and are not available in unlimited amounts and, moreover, whose properties are subject to considerable quality fluctuations which arise because they are natural substances.

Of particular interest then are substances which not only have excellent organoleptic properties (i.e. properties perceptible only by the senses), but, because of their strength and richness, can be used to achieve notable effects even at extremely low concentrations.

However, in the aroma and foodstuffs industry, substances which, apart from the property of imparting a certain odor or taste, have additional properties, e.g. a greater extendability or improved stability, are increasingly important.

SUMMARY OF THE INVENTION

We have found aromas and/or aroma compositions which comprise E- and/or Z-4,8-dimethyl-3,7-nonadien-2-one of the formulae

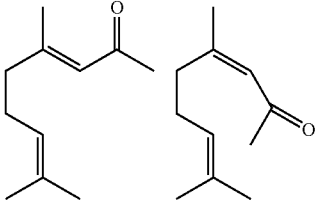

as individual isomer or as a mixture.

4,8-Dimethyl-3,7-nonadien-2-one is known per se (e.g. DE A 2256347). The odoriferous properties have been described (Flavour Fragrance J., 1996, 11, 15–23; Indian Perfum., 1983, 27, 112–18). The use as aroma is novel.

It is surprising that 4,8-dimethyl-3,7-nonadien-2-one not only has excellent aromatizing properties in aromas, but also increases the extendability and the intensity in these aromas and aroma compositions. In particular, 4,8-dimethyl-3,7-nonadien-2-one also has an intensifying effect in aromas and aroma compositions. In addition, the stability of the aromas and aroma composition is surprisingly improved.

DETAILED DESCRIPTION OF THE INVENTION

In a preferred use form, the stability of the aromas and aroma compositions according to the invention is increased through use in acidic medium.

Examples of acidic media which may be mentioned are refreshing drinks with and without a proportion of fruit juice or beverage bases.

The proportion of acid is usually chosen so that the PH is <5, preferably <3.

In combination with other aromatizing constituents, 4,8-dimethyl-3,7-nonadien-2-one gives these aromas and aroma compositions an excellent naturalness. In addition, 4,8-dimethyl-3,7-nonadien-2-one surprisingly gives aromas and aroma compositions an unusual fullness.

Aromas and aroma compositions according to the invention comprise aroma components and 4,8-dimethyl-3,7-nonadien-2-one. Aroma components are e.g. essential oils, individual aroma substances, plant extracts, fruit juices and concentrates thereof.

Examples of essential oils, plant extracts and fruit juices, and concentrates thereof which may be mentioned are:

citrus oils, buchu leaf oils, davana oils, cassia oils, cedarwood oils, geranium oils, grain fusel oils, lemongrass oils, musk seed oils, rose oils, cinnamon bark oils, oil of cloves, carrot seed oils, mace oils, massoi bark oils, sandalwood oils, and fractions thereof, fruit juice concentrates from all common fruits, guarana extracts, elderflower extracts, iris absolute, broom absolute, jasmine absolute, licorice extract, osmanthus absolute, iris root extract, vanilla extracts, chicory extracts, cinnamon extracts, boronia absolute.

Distillates from all common fruits

Examples of individual aroma substances (in the case of chiral compounds as racemate or as individual enantiomer or as enantiomer-enriched mixture) which may be mentioned are:

all common saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta–ionone, raspberry ketone, 2,5-dimethyl-4-hydroxy-3(2H)-furanone, limonene, linalool, linalool oxide, phenyl acetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyleugenol, anethole, anise alcohol, anisaldehyde, guaiacol, cinnamyl alcohol, cinnamaldehyde, citral, citronellal, citronellol, nerol, geraniol, ethylvanillin, benzyl alcohol, anisaldehyde, all common cinnamyl esters, all common benzyl esters, damascone, diacetyl, diethyl malonate, dihydrocoumarine, beta-7,8-dihydroionone, dimethyl anthranilate, methyl anthranilate, 2-(5)-ethyl-5(2)-methyl-4-hydroxy-3(2H)-furanone, E- and Z-4,8-dimethyl-3,7-nonadien-2-ol, ethylmaltol, eucalyptol, farnesal, farnesol, heliotropin, all common cis-3-hexenyl esters, alpha-irone, menthol, menthyl acetate, ethyl decadienoate, methyl dihydrojasmonate, methyl cinnamate, ethyl cinnamate, methyl salicylate, lactic acid, myrcene, neryl acetate, geranyl acetate, nootkatone, 2,3-pentanedione, all common 2-alkanones, 3-thiohexanol, 8-thiomenthan-3-one, rose oxide, 4-ketoisophorone, acetaldehyde diethyl acetal, acetaldeyde methylethyl acetal, cis-carvyl acetate, caryophyllene, caryophyllene oxide, 1,4-cineol, citroxides, trans-2-hexenal dimethyl acetal, linalyl acetate, nerolidol, perilla aldehyde, L-perillyl acetate, alpha-and beta-pinene, sinensal, gamma-terpinene, 4-terpineol, terpineols, terpinyl acetate, valencene.

Preferred aroma components are:

essential oils, plant extracts, fruit juices and concentrates thereof, such as, for example, citrus oils, buchu leaf oils, davana oils, cassia oils, cedarwood oils, lemongrass oils, rose oils, cinnamon bark oils, oil of cloves, carrot seed oils, mace oils, massoi bark oils, sandalwood oils, and fractions thereof.

Fruit juice concentrates from all common fruits.

Distillates from all common fruits.

Individual aroma substances (in the case of chiral compounds as racemate or as individual enantiomer or as enantiomer-enriched mixture) such as, for example, all common saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimehyl-4-hydroxy-3(2H)-furanone, limonene, linalool, linalool oxide, phenyl acetaldehyde, phenylacetic acid, 2-phenylethanol, maltol, vanillin, eugenol, 2-methyl-4-propyl-1,3-oxathiane, 3-methylthiohexanol, 4-methyl-4-mercapto-2-pentanone, methyl-eugenol, anethole, anise alcohol, anisaldehyde, guaiacol, cinnamyl alcohol, cinnamaldehyde, citral, citronellal, citronellol, nerol, geraniol, ethylvanillin, benzyl alcohol, anisaldehyde, all common cinnamyl esters, all common benzyl esters, damascone, diacetyl, diethyl malonate, dihydrocoumarin, beta-dihydroionone, dimethyl anthranilate, methyl anthranilate, 2(5)-ethyl-5(2)-methyl-4-hydroxy-3(2H)-furanone, E- and Z-4,8-dimethyl-3,7-nonadien-2-ol, ethylmaltol, heliotropin, all common cis-3-hexenyl esters, alpha-irone, ethyl decadienoate, methyl dihydrojasmonate, methyl cinnamate, ethyl cinnamate, methyl salicylate, nootkatone, 8-thiomenthanone-3, rose oxide, ketoisophorone, acetaldehyde diethyl acetal, acetaldeyde methylethyl acetal, cis-carvyl acetate, caryophyllene, caryophyllene oxide, 1,4-cineol, citroxides, trans-2-hexenal dimethyl acetal, linalyl acetate, nerolidol, perilla aldehyde, L-perillyl acetate, alpha-and beta-pinene, sinensal, gamma-terpinene, 4-terpineol, terpineols, terpinyl acetate, valencene.

Particularly preferred aroma components are:

essential oils, plant extracts, fruit juices and concentrates thereof, such as, for example, citrus oil, buchu leaf oils, cassia oils, cedarwood oils, lemongrass oils, carrot seed oils, mace oils, massoi bark oils, sandalwood oils, and fractions thereof.

Fruit juice concentrates from all common fruits.

Distillates from all common fruits.

Individual aroma substances (in the case of chiral compounds as racemate or as individual enantiomer or as enantiomer-enriched mixture) such as, for example, all common saturated and unsaturated fruit esters from the lower aliphatic acids $C_1$–$C_{12}$ and the lower alcohols $C_1$–$C_{12}$, the aliphatic saturated and unsaturated acids $C_1$–$C_{14}$, the aliphatic saturated and unsaturated alcohols $C_3$–$C_{14}$, the aliphatic saturated and unsaturated aldehydes $C_2$–$C_{14}$, the saturated and unsaturated gamma-lactones $C_5$–$C_{14}$, damascenone, alpha-ionone, beta-ionone, raspberry ketone, 2,5-dimethyl-4-hydroxy-3(2H)-furanone, limonene, linalool, phenyl acetaldehyde, 2-phenylethanol, maltol, vanillin, eugenol, 2-methyl-4-propyl-1,3-oxathiane, 3-methylthiohexanol, 4-methyl-4-mercapto-2-pentanone, anethole, anise alcohol, anisaldehyde, guaiacol, cinnamyl alcohol, cinnamaldehyde, citral, citronellal, citronellol, nerol, geraniol, ethylvanillin, benzyl alcohol, anisaldehyde, all common cinnamyl esters, all common benzyl esters, damascone, diacetyl, dihydrocoumarine, beta-dihydroionone, dimethyl anthranilate, methyl anthranilate, 2-(5)-ethyl-5(2)-methyl-4-hydroxy-3(2H)-furanone, E- and Z-4,8-dimethyl-3,7-nonadien-2-ol, ethylmaltol, heliotropin, all common cis-3-hexenyl esters, alpha-irone, ethyl decadienoate, methyl dihydrojasmonate, methyl cinnamate, ethyl cinnamate, noolkatone, 8-thiomenthanone-3, rose oxide, ketoisophorone, acetaldehyde diethyl acetal, acetaldeyde methylethyl acetal, cis-carvyl acetate, caryophyllene, caryophyllene oxide, 1,4-cineol, citroxides, trans-2-hexenal dimethyl acetal, linalyl acetate, nerolidol, perilla aldehyde, L-perillyl acetate, alpha- and beta-pinene, sinensal, gamma-terpinene, 4-terpineol, terpineols, terpinyl acetate, valencene.

Mint aromas and mint aroma compositions according to the invention consist of mint aroma components. These may, for example, be:

essential oils, such as, for example, peppermint oils, spearmint oils, mentha-arvensis oils, oil of cloves, citrus oils, cinnamon bark oils, wintergreen oils, cassia oils, davana oils, spruce needle oils, eucalyptus oils, fennel oils, galbanum oils, ginger oils, camomile oils, caraway oils, rose oils, geranium oils, sage oils, yarrow oils, aniseed oils, thyme oils, juniperberry oils, angelica root oils, and the fractions of these oils.

Individual aroma substances (in the case of chiral compounds as racemate or as individual enantiomer or as enantiomer-enriched mixture) such as, for example, menthol, menthone, isomenthone, menthyl acetate, menthofuran, mint lactone, eucalyptol, limonene, eugenol, pinene, sabinene hydrate, 3-octanol, carvone, gamma-octalactone, gamma-nonalactone, germacren-D, viridiflorol, 1,3E,5Z-undecatriene, isopulegol, piperitone, 3-octyl acetate, isoamyl isovalerate, hexanol, hexanal, cis-3-hexenol, linalool, E- and Z-4,8-dimethyl-3,7-nonadien-2-ol, alpha-terpineol, cis and trans carvyl acetate, p-cymene, damascenone, damascone, dimethyl sulfide, fenchol, cis-4-heptenal, isobutyraldehyde, isovaleraldehyde, cis-jasmone, anisaldehyde, methyl salicylate, myrtenyl acetate, 2-phenylethyl alcohol, 2-phenyl-ethyl isobutyrate, 2-phenylethyl isovalerate, cinnamaldehyde, geraniol, nerol.

Compounds with a physiological cooling effect such as, for example, menthol, menthone glycerol acetal, menthyl lactate, substituted menthyl-3-carboxamides (e.g. n-ethyl-menthyl-3-carboxamide), 2-isopropyl-N,2,3-trimethylbutanamide, substituted cyclohexanecarboxamides, 3-menthoxypropane-1,2-diol, 2-hydroxyethylmenthyl carbonate, 2-hydroxypropylmenthyl carbonate, N-acetyl-glycine menthyl ester, menthylhydroxycarboxylic esters (e.g. menthyl-3-hydroxy-butyrate), menthyl succinates, 2-mercaptocyclodecanone, 2-isopropyl-5-methylcyclo-hexyl-5-oxo-2-pyrrolidinecarboxylic acid.

Sweeteners such as, for example aspartame, saccharin, acesulfame-K, sorbitol; xylitol, cyclamates (e.g. sodium cyclamate), sucralose, alitame, neotam, thaumatin, neohesperidin DC, maltite, lactite.

Preferred mint aroma components are:

essential oils, such as, for example, peppermint oils, spearmint oils, mentha-arvensis oils, oil of cloves, citrus oils, wintergreen oils, cassia oils, davana oils, spruce needle oils, eucalyptus oils, fennel oils, galbanum oils, ginger oils, camomile oils, caraway oils, geranium oils, sage oils, yarrow oils, aniseed oils, thyme oils, juniperberry oils, angelica root oils, and the fractions of these oils.

Individual aroma substances (in the case of chiral compounds as racemate or as individual enantiomer or as enantiomer-enriched mixture) such as, for example, menthol, menthone, isomenthone, menthyl acetate, menthofuran, mint lactone, eucalyptol, limonene, eugenol, pinene, sabinene hydrate, carvone, isopulegol, piperitone, 3-octyl acetate, hexanol, hexanal, cis-3-hexenol, linalool, E- and Z-4,8-dimethyl-3,7-nonadien-2-ol, alpha-terpineol, cis and trans carvyl acetate, p-cymene, dimethyl sulfide, cis-4-heptenal, isobutyraldehyde, isovaleraldehyde, cis-jasmone, anisaldehyde, methyl salicylate, 2-phenylethyl alcohol, 2-phenylethyl isobutyrate, 2-phenylethyl isovalerate, cinnamaldehyde, geraniol, nerol.

Preferably:

compounds with a physiological cooling effect such as, for example, menthol, menthone glycerol acetal, menthyl lactate, N-ethyl-menthyl-3-carboxamide, 2-isopropyl-N,2,3-trimethylbutanamide, 3-menthoxypropane-1,2-diol, 2-hydroxyethylmenthyl carbonate, 2-hydroxypropylmenthyl carbonate, N-acetylglycine menthyl ester, menthyl 3-hydroxybutyrate, menthyl succinate, 2-isopropyl-5-methylcyclohexyl 5-oxo-2-pyrrolidinecarboxylic acid.

Preferred sweeteners such as, for example, aspartame, saccharin, acesulfame-K, sorbitol; xylitol, cyclamates (e.g. sodium cyclamate), sucralose, alitame.

Particular preference is given to the following mint aroma components:

essential oils, such as, for example, peppermint oils, spearmint oils, mentha-arvensis oils, wintergreen oils, and the fractions of these oils.

Individual aroma substances (in the case of chiral compounds as racemate or as individual enantiomer or as enantiomer-enriched mixture) such as, for example, menthol, menthone, isomenthone, menthyl acetate, menthofuran, mint lactone, eucalyptol, limonene, sabinene hydrate, carvone, isopulegol, piperitone, 3-octyl acetate, hexanol, hexanal, cis-3-hexenol, linalool, E- and Z-4,8-dimethyl-3,7-nonadien-2-ol, alpha-terpineol, cis and trans carvyl acetate, p-cymene, dimethyl sulfide, cis-4-heptenal, isobutyraldehyde, isovaleraldehyde, cis-jasmone, anisaldehyde, methyl salicylate, 2-phenylethyl alcohol, cinnamaldehyde.

In particular:

compounds with a physiological cooling effect such as, for example, menthol, menthone glycerol acetal, menthyl lactate, N-ethyl-menthyl-3-carboxamide, 3-menthoxypropane-1,2-diol, 2-hydroxyethylmenthyl carbonate, 2-hydroxypropyl-menthyl carbonate, 2-isopropyl-5-methylcyclohexyl 5-oxo-2-pyrrolidinecarboxylic acid.

Particular sweeteners are, for example, aspartame, saccharin, acesulfame-K, sorbitol; xylitol, cyclamates (e.g. sodium cyclamate). sucralose, alitame, neotam.

It is also possible to use mint and fruit aroma compositions and the various aroma components together.

The addition of solvents and/or carrier substances (adsorbent or dispersion agent) to the aroma compositions [lacuna] ready-to-use aromas which are usually added in this diluted form to foodstuffs and luxury products, and to products for oral hygiene. These ready-to-use aromas can comprise additives and auxiliaries. Preservatives, dyes, antioxidants, flow agents, thickeners, etc. can be regarded as such.

In the aroma compositions according to the invention, the amount of 4,8-dimethyl-3,7-nonadien-2-one used is usually present in 0.001 part by weight to 10 parts by weight, in particular 0.01 part by weight to 1 part by weight based on the total amount.

The aroma compositions according to the invention, and ready-to-use aromas can be in liquid form, spray-dried form or else in encapsulated form.

The spray-dried form is prepared from the liquid compositions by preparing an emulsion with the addition of certain amounts of a carrier material, preferably biopolymers such as starch, maltodextrin and gum arabic. This emulsion is dried in spray dryers by extremely fine distribution with simultaneous application of temperature. This gives a powder with the desired content of liquid aroma.

The encapsulated form is likewise prepared from the liquid compositions by adding a carrier material. There are various technologies with which aroma capsules can be prepared. The most common are extrusion, spray granulation and coacervation. The particle sizes usually range from 10 μm to 5 mm. The most common capsule materials are various starches, maltodextrin, gelatins. The liquid or solid aroma is incorporated in these capsules and can be released by various mechanisms, such as the application of heat, a shift in pH or chewing pressure.

Such aromas can be used throughout the entire foodstuffs and luxury products sector, and in products for oral hygiene. In particular, they can be used for aromatizing fatty compositions, bakery goods, yogurt, ice cream, confectionery, chewing gum, alcoholic and nonalcoholic beverages, tobacco, toothpaste and mouthwashes.

The concentration of such aromas is preferably 0.0005 to 2% by weight, in particular 0.01 to 1% by weight, based on the finished foodstuffs or luxury products, or the products for oral hygiene.

It has been known for a long time that many aromas and beverages only have a short shelf life. During storage, degradation reactions result in the formation of sensorially very intensive compounds which, as a result of their undesired aroma profile, lead to a lower acceptance of the product. There is therefore a desire by the foodstuffs and luxury products industry to prepare aromas and beverage bases which have an increased shelf life. This requirement is satisfied by the 4,8-dimethyl-3,7-nonadien-2-one according to the invention to a particular degree. If, for example, the 4,8-dimethyl-3,7-nonadien-2-one according to the invention is added to a citrus aroma, then the citrus aroma is retained over a relatively long period.

To use aromas and aroma concentrates economically, it is desired in the aroma industry to use aroma substances which are effective even in very low concentrations and which in addition have an intensifying effect. This requirement is satisfied by the 4,8-dimethyl-3,7-nonadien-2-one according to the invention to a particular degree. If, for example, half of the citral (a typical citrus aroma substance with similar aroma properties) is replaced by a sensorially adequate amount of 4,8-dimethyl-3,7-nonadien-2-one , then the aroma with 4,8-dimethyl-3,7-nonadien-2-one is more intensive than the aroma without 4,8-dimethyl-3,7-nonadien-2-one and in each case has a markedly fresher and more natural character which tastes more strongly of lemons.

The preparation of the E- and/oder Z-4,8-dimethyl dimethyl -3.7-nonadien-2-one according to the invention is carried out in a manner known per se.

4,8-Dimethyl-3,7-nonadien-2-one can advantageously be prepared from 4,8-dimethyl-3,7-nonadien-2-ol which has, for example, been synthesized by a Grignard reaction from citral and methylmagnesium chloride (Indian Perfum., 1983, 27, 112–18). The oxidation to give 4,8-dimethyl-3,7-nonadien-2-one is known (e.g. Inst. Quim. Univ. Nacl. Auton.

Mex. 1969, 21, 226–240). Here, reagents such as manganese dioxide and chromium trioxide are used, which are difficult to handle.

A novel process for the preparation of 4,8-dimethyl-3,7-nonadien-2-one is characterized in that 4,8-dimethyl-3,7-nonadien-2-ol is reacted in the presence of a catalyst and a hydrogen acceptor.

The reaction can be illustrated by the following reaction equation:

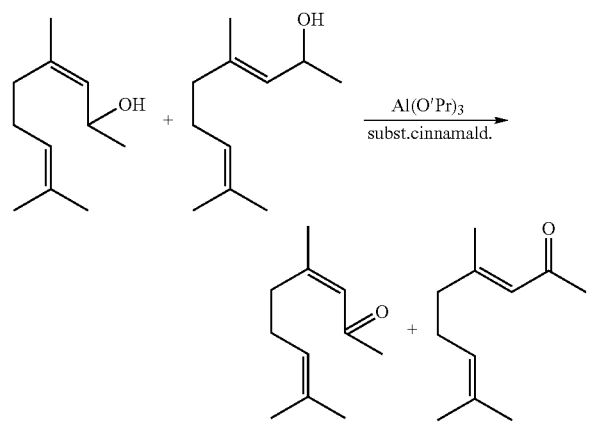

This reaction dispenses with critical reagents and can also be carried out without problems on a relatively large scale.

Catalysts which can be used are aluminum alkoxides, such as aluminum tritertiary-butoxide and aluminum triisopropoxide, preferably aluminum triisopropoxide.

The reaction temperature is between 40° C. and reflux temperature, preferably between 60–120° C.

Hydrogen acceptors which can be used are the known compounds (Org. Reactions, Vol. 6, pp. 207–272). It has, however, been found that the use of alpha-alkyl-substituted cinnamaldehyde derivatives, in particular alpha-amyl-and alpha-hexylcinnamaldehyde is particularly advantageous since in these cases both the conversion is good and the distillation is simplified. 4,8-Dimethyl-3,7-nonadien-2one and the alkyl-substituted cinnamaldehyde and cinnamal alcohol derivatives can then be separated easily.

EXAMPLES

Example 1

Citrus Aromas/lemons a) Lemon aroma (without 4,8-dimethyl-3,7-nonadien-2-one)
The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| Neryl acetate | 55 |

-continued

| | |
|---|---|
| Lemon oil citral-free | 400 |
| Abs. ethanol | 435 | b) Lemon aroma (with 4,8-dimethyl-3,7-nonadien-2-one)
The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| 4,8-Dimethyl-3,7-nonadien-2-one | 40 |
| Neryl acetate | 55 |
| Lemon oil citral-free | 395 |
| Abs. ethanol | 400 |

Test in a ready-made drink (conc.: 1 g/100 liters of RTD), yogurt without fruit preparation containing 3.5% fat content (conc.: 5 g/100 kg), ice cream (conc.: 5 g/100 kg), alcoholic drink with 40% by volume alcohol (conc.: 1.5 g/100 l) and hard caramels (conc.: 10 g/100 kg)

Result:
The lemon aroma with 4,8-dimethyl-3,7-nonadien-2-one in each case has a significantly fresher and more natural character which tastes more strongly of lemons.

Example 2 a) Lemon aroma (with citral/without 4.8-3,7-nonadien-2-one)
The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| Citral | 400 |
| Neryl acetate | 55 |
| Lemon oil citral-free | 400 |
| Abs. Ethanol | 35 | b) Lemon aroma (50% citral replaced by sensorially adequate amount of 4,8-dimethyl-3,7-nonadien-2-one)
The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |

-continued

| | |
|---|---|
| alpha-Terpineol | 25 |
| Geranyl acetate | 35 |
| 4.8-Dimethyl-3,7-nonadien-2-one | 20 |
| Neryl acetate | 55 |
| Lemon oil citral-free | 400 |
| Abs. Ethanol | 215 |
| Citral | 200 |

Test in a ready-made drink (conc.: 1 g/100 liters of RTD), yogurt without fruit preparation containing 3.5% fat content (conc.: 5 g/100 kg), ice cream (conc.: 5 g/100 kg). alcoholic drink with 40% by volume alcohol (Conc.: 1.5 g/100 l) and hard caramels (conc.: 10 g/100 kg)

Result:

The lemon aroma with 4,8-dimethyl-3,7-nonadien-2-one is more intensive than the aroma without 4,8-dimethyl-3,7-nonadien-2-one and in each case has a significantly fresher and more natural character which tastes more strongly of lemons.

Example 3

Lemon aroma (with citral/without 4,8-dimethyl-3,7-nonadien-2-one)

The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| Citral | 400 |
| Neryl acetate | 55 |
| Lemon oil citral-free | 400 |
| Abs. Ethanol | 35 |

Lemon aroma (without citral/with sensorially adequate amount of 4,8-dimethyl-3,7-nonadien-2-one)

The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| 4,8-Dimethyl-3,7-nonadien-2-one | 35 |
| Neryl acetate | 55 |
| Lemon oil citral-free | 400 |
| Abs. Ethanol | 400 |

Test in a ready-made drink (10° Brix, 0.3% citric acid)

Result:

The lemon aroma with 4,8-dimethyl-3,7-nonadien-2-one is significantly more stable and does not have degradation notes even after a storage period of 8 weeks.

Example 4

Lemon aroma (without citral/without 4.8-3,7-nonadien-2-one)

The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| Neryl acetate | 55 |
| Lemon oil citral-free | 400 |
| Abs. ethanol | 435 |

Lemon aroma (without citral/with aroma concentrate type C including 4,8-dimethyl-3,7-nonadien-2-one)

The following are mixed (all data as parts by weight):

| | |
|---|---|
| 4-Terpineol | 5 |
| Aldehyde C10 | 2 |
| Aldehyde C9 | 3 |
| Geraniol | 5 |
| Nerol | 5 |
| Citronellal | 10 |
| Lionalool | 20 |
| alpha-Terpineol | 25 |
| Geranyl acetate | 35 |
| Aroma concentrate type C | 35 |
| Neryl acetate | 55 |
| Lemon oil citral-free | 400 |
| Abs. ethanol | 400 |

Aroma concentrate type C:

The following are mixed (all data as parts by weight):

| | |
|---|---|
| Perilla aldehyde | 10 |
| Aldehyde C11 | 20 |
| Citronellal | 100 |
| Aldehyde C9 | 100 |
| 4.8-Dimethyl-3,7-nonadien-2-one | 770 |

Test in a ready-made drink (conc.: 1 g/100 liters of RTD), yogurt without fruit preparation containing 3.5% fat content (conc.: 5 g/100 kg), ice cream (conc.: 5 g/100 kg), alcoholic drink with 40% by volume alcohol (conc.: 1.5 g/100 l) and hard caramels (conc.: 10 g/100 kg)

Result:

The lemon aroma with aroma concentrate type C including 4,8-dimethyl-3,7-nonadien-2-one has a virtually identical citral impression, comparable with a lemon aroma containing citral.

Example 5

Lemon-mint Aromas:

Lemon-mint aroma (without 4,8-dimethyl-3,7-nonadien-2-one)

The following are mixed (all data as parts by weight):

| | |
|---|---|
| Linalyl acetate | 2 |
| Lanalool | 2 |
| Spearmint oil, American | 35 |
| L-Menthol | 70 |
| Peppermint oil, Willamette | 70 |
| Peppermint oil, Yakima | 171 |
| Lemon oil, Argentinean | 300 |
| Peppermint oil, American | 350 |

Lemon-mint aroma (with 4,8-dimethyl-3,7-nonadien-2-one)

The following are mixed (all data as parts by weight):

| | |
|---|---|
| Linalyl acetate | 2 |
| Lanalool | 2 |
| 4,8-Dimethyl-3,7-nonadien-2-one | 5 |
| Spearmint oil, American | 35 |
| L-Menthol | 70 |
| Peppermint oil, Willamette | 70 |
| Peppermint oil, Yakima | 166 |
| Lemon oil, Argentinean | 300 |
| Peppermint oil, American | 350 |

Test in Toothpaste Composition (Conc.: 1%)

Result:

The lemon-mint aroma containing 4,8-dimethyl-3,7-nonadien-2-one is more intensive than the aroma without 4,8-dimethyl-3,7-nonadien-2-one and has a significantly fresher, more tangy character which tastes more strongly of lemons.

Example 6 a) Mango Aromas:

Mango aroma (without 4,8-dimethyl-dimethyl-3,7-nonadien-2-one)

The following are mixed (all data as parts by weight):

| | |
|---|---|
| Caryophyllene oxide | 5 |
| 8,3-Thiomenthanone(10% strength in 1,2-propylene glycol) | 10 |
| Nerol | 30 |
| cis-3-Hexenyl acetate | 35 |
| cis-3-Hexenol | 100 |
| Alcohol C6 | 120 |
| gamma-decalactone | 180 |
| Furaneol (10% strength in 1,2-propylene glycol) | 520 |

Mango aroma concentrate (containing 4,8-dimethyl-3,7-nonadien-2-one)

The following are mixed (all data as parts by weight):

| | |
|---|---|
| Caryophyllene oxide | 5 |
| 8,3-Thiomenthanone (10% strength in 1,2-propylene glycol) | 10 |
| 4,8-Dimethyl-3,7-nonadien-2-one | 10 |
| Nerol | 30 |
| cis-3-Hexenyl acetate | 35 |
| cis-3-Hexenol | 100 |
| Alcohol C6 | 120 |
| gamma-decalactone | 180 |
| Furaneol (10% strength in 1,2-propylene glycol) | 510 |

Test in a ready-made drink (conc.: 1 g/100 liters of RTD), yogurt without fruit preparation containing 3.5% fat content (conc.: 5 g/100 kg), ice cream (conc.: 5 g/100 kg), alcoholic drink with 40% by volume alcohol (conc.: 1.5 g/100 l) and hard caramels (conc.: 10 g/100 kg)

Result:

The mango aroma containing 4,8-dimethyl-3,7-nonadien-2-one has a stronger fresh fruit character. It is markedly fuller and more juicy and has a stronger aftertaste.

b) Pineapple Aromas:

Pineapple aroma (without 4,8-dimethyl-3,7-nonadien-2-one)

The following are mixed (all data as parts by weight):

| | |
|---|---|
| gamma-Octalactone | 15 |
| gamma-Decalactone | 15 |
| Ethyl 3-methylthiopropionate | 20 |
| Linalool | 30 |
| Hexyl caproate | 40 |
| Ethyl caproate | 60 |
| Allyl caproate | 130 |
| 1,2-Propylene glycol | 160 |
| Furaneol (10% strength in 1,2-propylene glycol) | 230 |
| Ethyl butyrate | 300 |

Pineapple aroma (with 4,8-dimethyl-3,7-nonadien-2-one)

The following are mixed (all data as parts by weight):

| | |
|---|---|
| 4,8-Dimethyl-3,7-nonadien-2-one | 10 |
| gamma-Octalactone | 15 |
| gamma-Decalactone | 15 |
| Ethyl 3-methylthiopropionate | 20 |
| Linalool | 30 |
| Hexyl caproate | 40 |
| Ethyl caproate | 60 |
| Allyl caproate | 130 |
| 1,2-Propylene glycol | 150 |
| Furaneol (10% strength in 1,2-propylene glycol) | 230 |
| Ethyl butyrate | 300 |

Test in a ready-made drink (conc.: 1 g/100 liters of RTD), yogurt without fruit preparation containing 3.5% fat content (conc.: 5 g/100 kg), ice cream (conc.: g/100 kg), alcoholic drink with 40% by volume alcohol (conc.: 1.5 g/100 l) and hard caramels (conc.: 10 g/100 kg)

Result:

The pineapple aroma containing 4,8-dimethyl-3,7-nonadien-2-one has a stronger fresh fruit character. It is significantly fuller and more juicy and supports the tropical notes.

c) Strawberry Aromas

Strawberry aroma (without 4,8-dimethyl-3,7-nonadien-2-one)

The following are mixed (all data as parts by weight):

| | |
|---|---|
| Methyl cinnamate | 25 |
| gamma-Decalactone | 30 |
| Ethyl caproate | 60 |
| cis-3-Hexenyl acetate | 60 |
| Ethyl butyrate | 185 |
| cis-3-Hexenol | 100 |
| 2-Methylbutyric acid | 180 |
| Caproic acid | 180 |
| Furaneol (10% strength in 1,2-propylene glycol) | 180 |

Strawberry aroma (containing 4,8-dimethyl-3,7-nonadien-2-one)

The following are mixed (all data as parts by weight):

| | |
|---|---|
| 4,8-Dimethyl-3,7-nonadien-2-one | 10 |
| Methyl cinnamate | 25 |
| gamma-Decalactone | 30 |
| Ethyl caproate | 60 |
| cis-3-Hexenyl acetate | 60 |
| Ethyl butyrate | 185 |
| cis-3-Hexenol | 100 |
| 2-Methylbutyric acid | 180 |
| Caproic acid | 180 |
| Furaneol (10% strength in 1,2-propylene glycol) | 180 |

Test in a ready-made drink (conc.: 1 g/100 liters of RTD), yogurt without fruit preparation containing 3.5% fat content (conc.: 5 g/100 kg), ice cream (conc.: 5 g/100 kg), alcoholic drink with 40% by volume alcohol (conc.: 1.5 g/100 l) and hard caramels (conc.: 10 g/100 kg)

Result:

The strawberry aroma containing 4,8-dimethyl-3,7-nonadien-2-one has a stronger fresh fruit character. It is significantly more tangy and more juicy and supports the ripe strawberry notes.

Example 7

Synthesis of 4,8-dimethyl-3,7-nonadien-2-one 150 g of 4,8-dimethyl-3,7-nonadien-2-ol, 252.5 g alpha-amylcinnamaldehyde and 16.9 g of aluminum isopropoxide are refluxed for 30 min at 1 mbar. A product/reactant mixture is then distilled over a 15 cm packed column (reflux ratio 1:1). This gives 130 g of the mixture of E- and Z-4,8-dimethyl-3,7-nonadien-2-ol and E- and Z-4,8-dimethyl-3,7-nonadien-2-one. The sum of the two isomers of 4,8-dimethyl-3,7-nonadien-2-ol is 23%, and the sum of the two isomers of 4,8-dimethyl-3,7-nonadien-2-one is 70%.

E-4,8-dimethyl-3,7-nonadien-2-one (EI 70 eV mass spectrum):

| m/e | Intensity/% |
|---|---|
| 69 | 100 |
| 41 | 68 |
| 83 | 47 |
| 43 | 32 |
| 98 | 21 |
| 123 | 17 |
| 108 | 12 |
| 39 | 10 |
| 166 | 9 |
| 27 | 8 |

Z-4,8-dimethyl-3,7-nonadien-2-one (EI 70 eV mass spectrum):

| m/e | Intensity/% |
|---|---|
| 69 | 100 |
| 41 | 84 |
| 83 | 64 |
| 43 | 64 |
| 98 | 26 |
| 123 | 25 |
| 108 | 21 |
| 39 | 17 |
| 82 | 19 |
| 109 | 18 |

What is claimed is:

1. An aroma composition comprising E- and/or Z-4,8-dimethyl-3,7-nonadien-2-one of the formulae

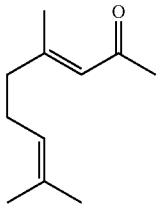 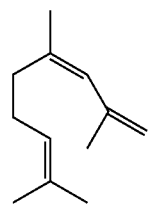

as individual isomer or as a mixture, and an acidic medium.

2. An aroma composition comprising E- and/or Z-4,8-dimethyl-3,7-nonadien-2-one of the formulae

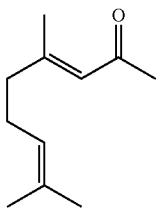 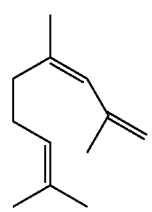

as individual isomer or as a mixture, wherein said E- and/or Z-4,8-dimethyl-3,7-nonadien-2-one is present in an amount of from 0.001 to 10 parts by weight, based on the total weight of the aroma composition;

wherein the aroma composition comprises E- and/or Z-4,8-dimethyl-3,7-nonadien-2-one and an acidic medium.

3. The aroma and/or aroma composition as claimed in claim 2, having E- and/or Z-4,8-dimethyl-3,7-nonadien-2-one in an amount of from 0.01 to 1 part by weight, based on the total weight of the aroma composition.

4. The aroma and/or aroma composition as claimed in claims 2, wherein the acidic media is a fruit juice, fruit juice concentrate or a beverage base.

5. A foodstuff comprising a food and an aroma composition, wherein the aroma composition comprises E- and/or Z-4,8-dimethyl-3,7-nonadien-2-one as individual isomer or as a mixture.

6. The foodstuff as claimed an claim 5, wherein the food is a bakery good, yogurt, ice cream, confectionery or chewing gum.

7. A luxury product comprising an aroma composition, wherein the aroma composition comprises E- and/or Z-4,8-dimethyl-3,7-nonadien-2-one as individual isomer or as a mixture, and an alcoholic beverage, a non-alcoholic beverage or tobacco.

8. A preparation for oral hygiene comprising an oral hygiene composition and E- one Z-4,8-dimethyl-3,7-nonadien-2-one as individual isomer or as a mixture.

9. A preparation for oral hygiene as claimed in claim 8, wherein the oral hygiene composition is toothpaste or mouthwash.

10. A process for the preparation of 4,8-dimethyl-3,7-nonadien-2-one, comprising the step of reacting 4,8-dimethyl-3,7-nonadien-2-ol in the presence of an aluminum alkoxide catalyst and a hydrogen acceptor.

11. The foodstuff as claimed in claim 5, wherein the food is a fatty composition.

* * * * *